United States Patent [19]
Henkel

[11] Patent Number: 5,988,657
[45] Date of Patent: *Nov. 23, 1999

[54] CARRY-ON STROLLER CASE

[76] Inventor: Robert R. Henkel, 2617 Poplar Grove, Schertz, Tex. 78154

[*] Notice: This patent is subject to a terminal disclaimer.

[21] Appl. No.: 09/281,216

[22] Filed: Mar. 30, 1999

Related U.S. Application Data

[62] Division of application No. 09/134,903, Aug. 17, 1998
[60] Provisional application No. 60/058,577, Sep. 11, 1997.

[51] Int. Cl.⁶ .................................................. B62B 1/00
[52] U.S. Cl. ................................... 280/47.25; 280/47.26; 280/638; 190/1; 297/129
[58] Field of Search ............................. 280/47.25, 47.26, 280/47.38, 658, 638, 657, 47.18, 47.19; 190/8, 110, 1, 18 A; 297/188.03, 188.11, 188.12, 129

[56] References Cited

U.S. PATENT DOCUMENTS

| | | |
|---|---|---|
| D. 323,933 | 2/1992 | Johnston . |
| D. 365,925 | 1/1996 | Roan . |
| 3,897,080 | 7/1975 | Isom . |
| 4,786,064 | 11/1988 | Baghdasarian . |
| 5,230,450 | 7/1993 | Mahvi et al. . |
| 5,230,523 | 7/1993 | Wilhelm . |
| 5,290,049 | 3/1994 | Crisp et al. . |
| 5,439,154 | 8/1995 | Delligatti . |
| 5,478,096 | 12/1995 | Ting . |
| 5,515,954 | 5/1996 | Nordstrom . |
| 5,593,008 | 1/1997 | Magnusson . |
| 5,641,170 | 6/1997 | Helm . |
| 5,695,246 | 12/1997 | Tsai . |

*Primary Examiner*—J. J. Swann
*Assistant Examiner*—James S. McClellan
*Attorney, Agent, or Firm*—Richard C. Litman

[57] ABSTRACT

A multipurpose suitcase dimensioned and configured to be allowed into a passenger airplane as carry-on luggage. The suitcase includes a base compartment and a movable upper compartment. The suitcase can be quickly reconfigured to form a seat on which a child can be seated. A harness secures the child in the seat. The invention permits a parent to transport an infant or toddler easily through a busy airport, together with luggage.

14 Claims, 4 Drawing Sheets

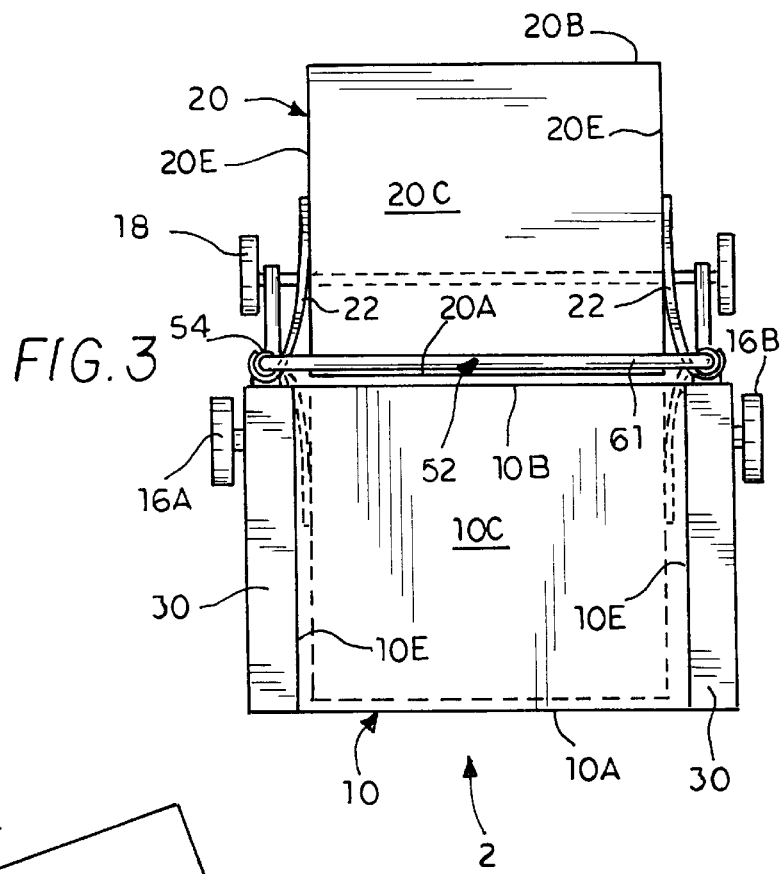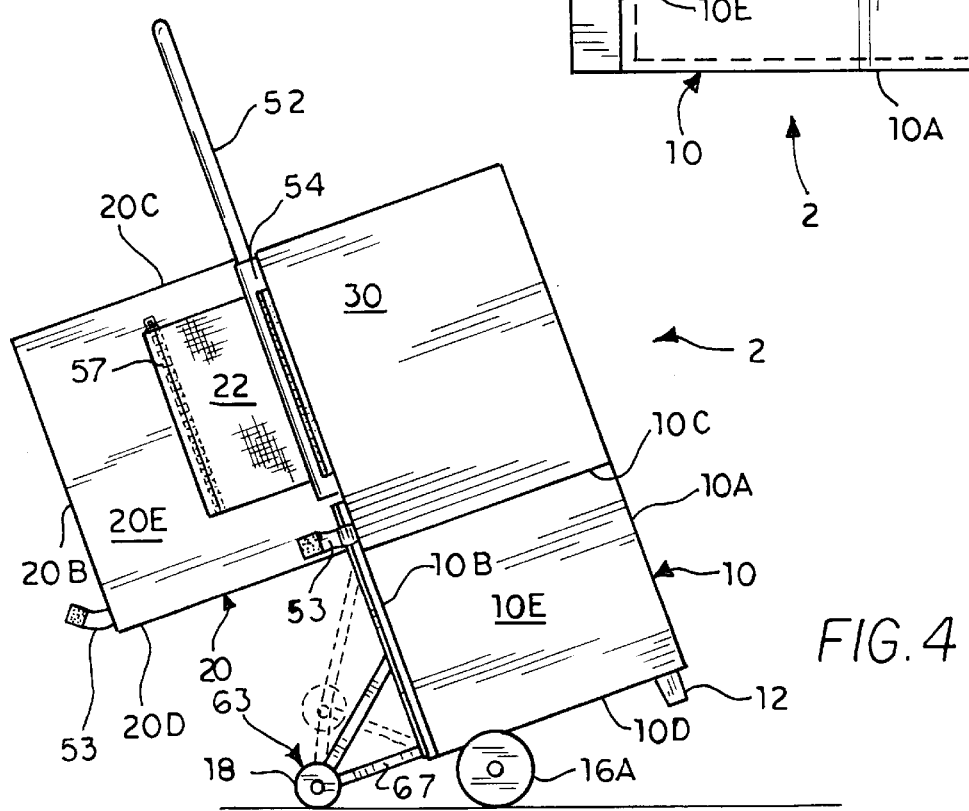

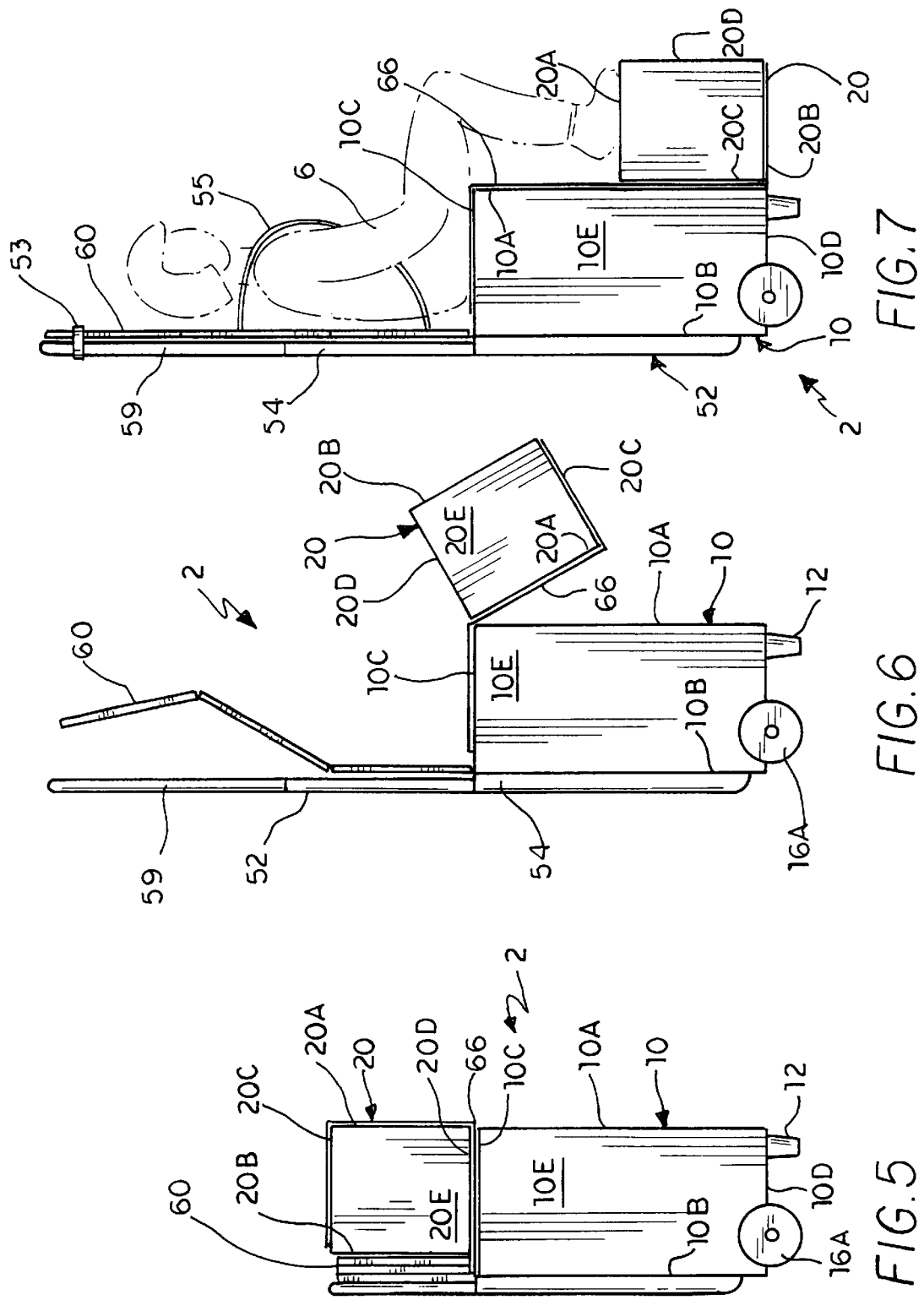

CARRY-ON STROLLER CASE

CROSS-REFERENCE TO RELATED APPLICATION

This application is a divisional of U.S. patent application Ser. No. 09/134,903, filed Aug. 8, 1998, which claims the benefit of U.S. Provisional Patent Application Ser. No. 60/058,577, filed Sep. 11, 1997.

BACKGROUND OF THE INVENTION

1. Field of the Invention

The present invention relates to wheeled luggage, and more particularly to a wheeled suitcase with a compartment that is slidable or movable, to create a seat suitable for an infant or toddler.

2. Description of Related Art

Various wheeled luggage devices have been developed in the past. Typically, a suitcase is configured with a pair of wheels. The wheels permit the user to more easily transport the suitcase as the suitcase is rolled on its wheels. However, only smaller sized suitcases may be carried on board an airplane. Hence, carry-on suitcases must be dimensioned and configured to fit under the seats or into the overhead storage compartments of passenger airplanes.

Similarly, baby strollers are configured with wheels to more easily transport a child. Many such baby strollers are collapsible, when not in use, for compact storage. Most baby strollers are too long to fit under a seat or into an overhead bin, even when folded. It is the usual practice of many airlines not to permit baby strollers to be carried into the airplane as carry-on luggage. The baby stroller must therefore be checked at the gate, if not sooner.

A typical scenario for a busy traveller would be for one parent to be rushing through a typical airport (e.g., Los Angeles, Dallas/Fort Worth, Atlanta, O'Hare, etc.) with at least one young child. Frequently the parent will be rushing to make a connecting flight. The young child is either too young or too tired to walk quickly through the airport. The parent would most likely carry the child (since the stroller has been taken away by the airline), along with a diaper bag, overnight bag, briefcase, computer case, and the like. This juggling act is difficult at best, and impossible at worst.

An ordinary wheeled carry-on suitcase typically has a length of about 22 inches. A tired toddler can be perched on top of such a wheeled suitcase and wheeled along through an airport. However, this approach has several disadvantages. The child has nothing conveniently located to hang onto or to hold him in place. The child can easily fall off and be injured. The child has nothing to lean against except the handle of the suitcase, which can be uncomfortable. Since the suitcase itself is not meant to be sat on, it is generally uncomfortable and may also be slippery. A child too young to sit up alone or hold on by himself cannot be perched on the suitcase at all.

From the adult's point of view, the child's weight placed on top of a 22 inch suitcase alters the center of gravity of the wheeled suitcase. The child's weight is largely supported by the adult's arm. The arm quickly tires out and becomes painful. The high center of gravity also makes the wheeled suitcase unstable, so that it is likely to tip over to the side, especially when turning corners.

Accordingly, a need will be seen for a suitcase that is sized to be brought into an airplane as carry-on luggage and can be reconfigured as a baby stroller. Related prior art patents will now be discussed.

U.S. Pat. No. 5,515,954 issued to Nordstrom on May 14, 1996 describes a mobile carry-on suitcase. The suitcase has an extendable handle that is movable between extended and retracted positions, and wheels. The suitcase is tilted for transport on the wheels and it is manipulated by the handle. This device cannot safely transport a child through a busy airport.

U.S. Pat. No. 5,230,450 issued to Mahvi et al. on Jul. 27, 1993 describes an infant care bag. The bag may store bottles, diapers and other infant care items. The device comprises a primary bag section and a removable auxiliary bag section. The primary bag section may be worn as a backpack and it can be used as a booster seat. No wheeled transport mechanism is disclosed and this device has no safety measures to transport a child safely through a busy airport.

U.S. Pat. No. 5,290,048 issued to Crisp et al. on Mar. 1, 1994 describes a typical stroller device. The device is collapsible for compact storage. The device may include detachable bags. Such a stroller device would not be permitted on board a passenger airplane as carry-on luggage.

None of the above noted inventions and patents, taken either singly or in combination, is seen to describe the instant invention as claimed.

SUMMARY OF THE INVENTION

The present invention is a multipurpose suitcase that is dimensioned and configured to be allowed into a passenger airplane as carry-on luggage. The suitcase can be quickly reconfigured to form a seat on which a child can be seated. A seat belt or safety harness will secure the child in the seat. The present invention will permit a parent to transport a child through a busy airport.

Accordingly, it is a principal object of the present invention to provide a wheeled carry-on suitcase which can quickly be reconfigured to transport a child safely through a busy airport.

Another of the objects of the present invention is to provide a wheeled carry-on suitcase which includes a seat belt or harness that will secure the child in the configured seat.

Yet another of the objects of the present invention is to provide a wheeled carry-on suitcase which is light-weight.

Still another of the objects of the present invention is to provide a wheeled carry-on suitcase which is economical to produce.

These and other objects of the present invention will be more readily apparent as the nature of the invention is hereinafter more fully described, illustrated and claimed with reference being made to the attached drawings.

BRIEF DESCRIPTION OF THE DRAWINGS

FIG. 3 is a top plan view of the carry-on wheeled suitcase of FIG. 1.

FIG. 4 is a side elevational view of a second embodiment of the wheeled suitcase.

FIG. 5 is a side elevational view of a third embodiment of the carry-on wheeled suitcase configured in the compact position.

FIG. 6 is a side elevational view of the carry-on wheeled suitcase of FIG. 5 that is in the process of being configured to the seat position.

FIG. 7 is a side elevational view of the carry-on wheeled suitcase of FIG. 6 in the seat position.

DETAILED DESCRIPTION OF THE PREFERRED EMBODIMENTS

The present invention is a multipurpose suitcase that is configured and dimensioned to be allowed into a passenger airplane as carry-on luggage. The suitcase can be quickly reconfigured to form a seat on which a child can be seated. A seat belt or harness will secure the child in the seat. The present invention will permit a parent to transport a child through a busy airport.

Preferred embodiments of the various aspects of the present invention will now be explained with reference to the accompanying drawings. By way of illustration and not limitation, FIGS. 1 to 8 are presented to show the preferred embodiments of the applicant's invention.

Figures 1, 2:
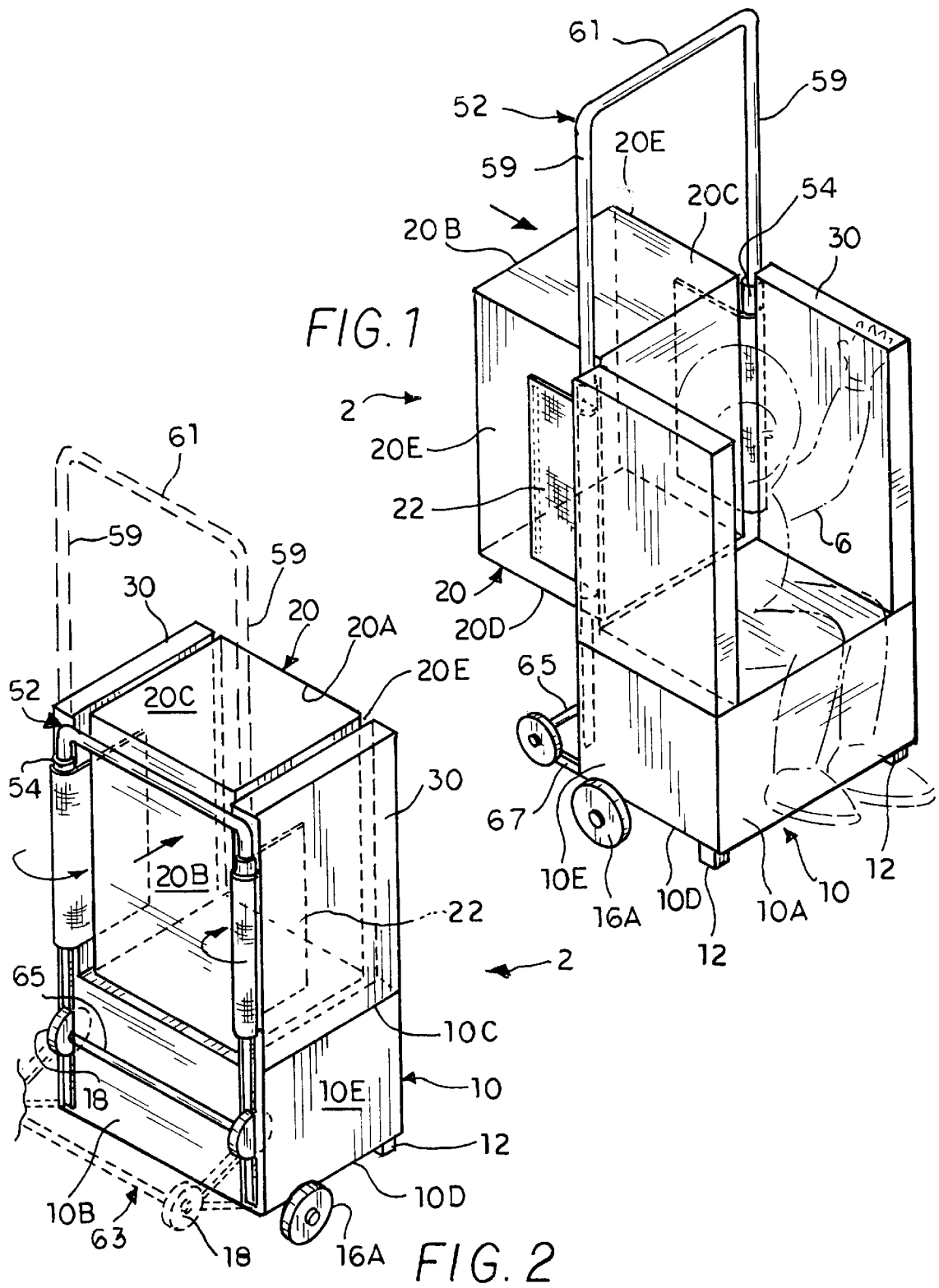
FIG. 1 is a perspective view of a carry-on wheeled suitcase that is configured in the seat position.
FIG. 2 is a perspective view of the carry-on wheeled suitcase of FIG. 1 that is configured in the compact position.
Figure 8:
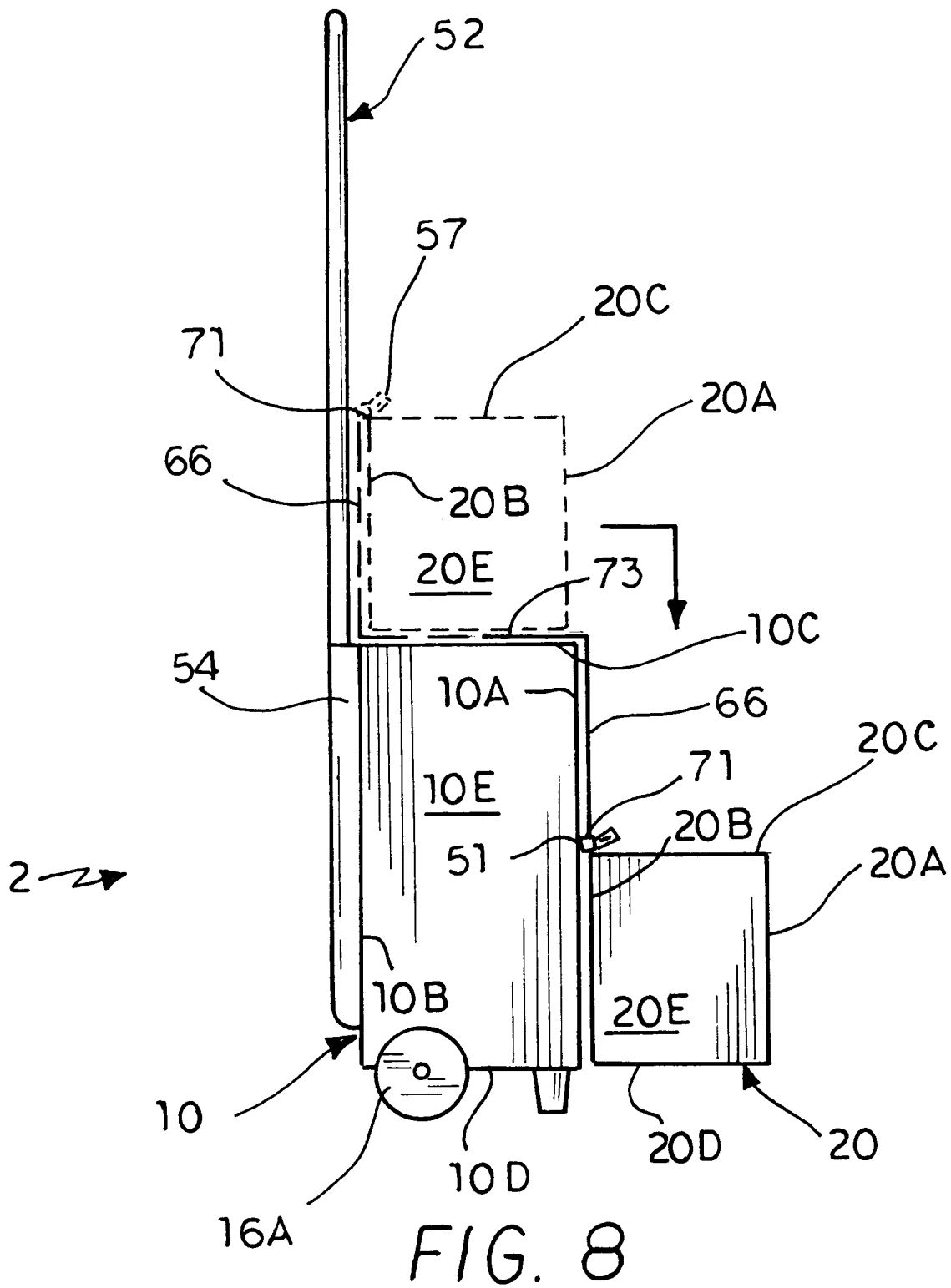
FIG. 8 is a side elevational view of a fourth embodiment of the wheeled suitcase.

FIGS. 1–3 show one embodiment of the present invention. FIG. 4 shows a second embodiment which is a modification of the first embodiment. FIGS. 5–7 show a third embodiment of the present invention. FIG. 8 shows a fourth embodiment which is similar to the third embodiment.

The multipurpose wheeled suitcase 2 includes a base compartment 10 and an upper compartment 20. Each of the compartments is substantially box-shaped. The base compartment 10 has a front face 10A, a rear face 10B, an upper face 10C, a lower 10D and two side faces 10E. The upper compartment 20 includes a front face 20A, a rear face 20B, an upper face 20C, a lower face 20D, and two side faces 20E.

The compartments 10 and 20 are composed of standard luggage materials. The faces of the compartments may be flexible, as in standard soft-sided luggage, or rigid. The faces may or may not have an underlying rigid framework. A rigid frame for the compartments is useful in providing support to the seat. A rigid frame may not be necessary, however, if the compartments are tightly packed or if some sagging under the child's weight is acceptable.

The upper compartment 20 is preferably configured as a diaper bag and includes pockets for diapers, bottles, wet or dry clothing, a changing pad, and the like. The base compartment 10 is preferably configured as an overnight bag for an adult and includes space for clothes, shoes, a laptop computer, and the like. With the one wheeled suitcase 2 an adult and a child can go on an overnight trip without checking any bags at all. For a longer trip the same adult and child can keep enough with them to easily manage an overnight stay, even if the remainder of their luggage is lost or delayed.

The upper compartment 20 of the first and second embodiments slides horizontally between a compact position and a seat position, as shown in FIGS. 1–4. In the compact position the lower face 20D of the upper compartment 20 is substantially adjacent to and rests generally on the upper face 10C of the base compartment 10. In the seat position at least a portion of the upper face 10C of the base compartment is exposed. The exposed portion forms a seat adapted to seating a child. Preferably all or nearly all of the upper face 10C of the base compartment forms the seat. The seat may be contoured and/or padded for the child's comfort. The surface of the seat preferably is composed of a non-slippery material, such as fabric, foam, or textured plastic, so that the child does not slide around on the seat. In the seat position the child leans against the front face 20A of the upper compartment 20, so that his back is supported.

If desired, the upper compartment 20 may detach from the rest of the wheeled suitcase 2. This allows the upper compartment to be used separately as a diaper bag on arrival at a destination.

A handle 52 is attached to the rear face 10B of the base compartment 10. The upper compartment 20 may be attached to either the handle 52 or to the base compartment 10. The attachment may or may not be releasable. A variety of securing mechanisms 53 can lock the upper compartment 20 in either the compact position or the seat position. Various structures, such as adhesive strips, hook and loop (e.g., VELCRO) fasteners, snaps, parachute clips, etc., may be used to secure the upper compartment 20. For example, hook and loop fastener may be used to secure the rear face 20B of the upper compartment to the handle 52, as shown in FIG. 4.

The handle 52 is a standard telescoping handle used for wheeled luggage. The handle 52 is generally U-shaped and has a cross bar 61, two telescoping tubes 59, and two slide tubes 54. Each of the telescoping tubes 59 mates with and slides in and out of one of the slide tubes 54. Each of the telescoping tubes 59 may telescope twice if desired. The cross bar 61 may include a gripping member. The handle 52 telescopes from a retracted position, as shown in FIGS. 1 and 5, to an extended position, as shown in FIGS. 1–4 and 6–8. The handle 52 preferably includes a latch to lock the handle into either the retracted or extended positions. The handle 52 in the extended position is adapted to moving the wheeled suitcase, preferably by pulling.

Preferably in the first and second embodiments two fabric flaps 22 attach the upper compartment 20 to the handle 52, as shown in FIGS. 1–4. A first end of each fabric flap 22 is attached to one of the side faces 20E of the upper compartment, approximately midway between the front and rear faces of the upper compartment. A second end of each fabric flap 22 is attached to one of the slide tubes 54 of the handle 52. Each of the ends of the fabric flaps extends generally parallel to the handle 52. This arrangement allows the upper compartment 20 to horizontally slide along the upper face 10C of the lower compartment 10. Changing from the compact position to the seat position and back is rapid and easy.

Each fabric flap is preferably generally rectangular and has a length and a width. The length of each fabric flap extends parallel to the handle and is preferably ⅔ or more of the length of the upper compartment. If the length is too short, the upper compartment may have a tendency to twist in the seat position. The width of the fabric flap is preferably about ½ of the thickness of the upper compartment. This width allows the upper compartment to slide so that the seat is exposed, but keeps the upper compartment close enough to the seat to act as a back support.

Instead of a single fabric flap 22, two or more flaps or straps may be used on each side of the upper compartment. However, a single fabric flap is easier to attach and detach, and also forms a more stable back support. A single flap also provides fewer opportunities for objects (such as toys) to fall through.

If desired, a third fabric flap may attach the lower face 20D of the upper compartment to the upper face 10C of the base compartment. This provides additional stability to the seat.

The fabric flaps 22 may be permanently or releasably attached. The fabric flaps 22 may be attached with stitching, as shown in FIGS. 1–3. A more complex alternative would be to provide a roller system which would automatically roll and unroll the fabric flap. Most preferably each of the fabric flaps 22 releasably attaches to one of the side faces 20E of the upper compartment with a zipper 57, as shown in FIG. 4.

When the upper compartment 20 is slid toward and through the handle 52, a substantial portion of the upper face 10C of the base compartment 10 is exposed. The upper face 10C of the base compartment then forms a seat for a child 6, with the back of the child resting against the front face 20A of the upper compartment 20.

The wheeled suitcase 2 includes at least two base wheels, 16A and 16B. Each of the base wheels is rotatably attached to the base compartment, substantially near the lower face 10D, the rear face 10B, and one of the side faces 10E of the base compartment. Preferably each base wheel 16A or 16B is attached to the lower face 10D of the base compartment 10, substantially near to the rear face 10B of the base compartment 10. While being rolled, the wheeled suitcase is supported by the base wheels 16A and 16B. The base wheels must be sufficiently sturdy to support the weight of the packed wheeled suitcase and the additional weight of the child. Suitable wheels are available for conventional wheeled luggage.

The wheeled suitcase 2 may include one or more rest pads 12. Preferably two rest pads 12 are attached to the lower face 10D of the base compartment 10, substantially near the front face 10A of the base compartment 10. Each rest pad 12 is located substantially near one of the side faces 10E of the base compartment. Preferably the length of each rest pad 12 approximately corresponds to the clearance of the base wheels 16A and 16B. When upright, the wheeled suitcase is then supported in a stable rest position by the base wheels 16A and 16B and the rest pads 12.

Preferably the wheeled suitcase 2 has only two wheels. This reduces the complexity and makes handling easier in tight quarters such as airplane aisles and overhead bins. Having only two wheels also decreases manufacturing costs and makes the wheeled suitcase lighter in weight.

If an additional set of wheels is desired or deemed necessary for safety, the wheeled suitcase 2 may include a retractable wheel assembly 63. The wheel assembly 63 includes two retractable wheels 18, an axle 65, and at least two wheel supports 67. The wheel assembly 63 may have two wheel supports 67, as shown in FIGS. 1 and 2, or four wheel supports 67, as shown in FIG. 4. Each of the wheel supports 67 is pivotally attached at one end to the rear face of the base compartment. The other end is attached to one of the retractable wheels 18. The wheel supports 67 have a retracted position and an extended position. In the retracted position the wheel supports 67 preferably slide substantially into the handle 52. If only two wheel supports 67 are used, the retractable wheels may simply swing up or down as needed. If four wheel supports 67 are used, the wheel supports may be pivotally connected at both ends to enable the wheel supports to slide into the handle 52.

The wheel assembly 63 preferably includes a latch to lock the retractable wheels in the extended or retracted positions. With the retractable wheels 18 extended, the wheeled suitcase 2 can be moved like a push cart or a conventional stroller, on four wheels. This is easier to handle in some situations than the two-wheeled version, and also allows the child to face forward.

The wheeled suitcase 2 may have two side compartments 30. Each of the side compartments 30 is adjacent to one of the side faces 20E of the upper compartment 20 in the compact position. In the seat position, the side compartments 30 are adjacent to the seat. The side compartments 30 are adapted to prevent the child in the seat from sliding sideways and give the child a greater feeling of security. The side compartments 30 also help to stabilize the upper compartment 20 in the compact position against sideways motion.

The side compartments may be rectangular, as shown in FIG. 14, or they may be contoured in an armrest shape. The side compartments may be a simple triangular piece of flexible material attached to the upper face of the base compartment and to the handle. The side compartments 30 may be adapted to hold thin or small objects, such as file folders or medications. The side compartments may be rigid or may be of flexible material over a rigid framework. The side compartments 30 may be detachably attached, for example to the upper face 10C of the base compartment 10.

A harness 55 may be included in the wheeled suitcase 2 to retain the child 6 in the seat, as shown in FIG. 7. The harness 55 allows children too young to hold on or to sit up alone to be carried on the seat. The harness 55 may be a simple seat belt, or a 3-point or a 5-point harness. The harness 55 may attach to the upper face 10C of the base compartment, to the front face 20A of the upper compartment, to the handle 52, to the side compartments 30, or to any combination of these. For example, a 3-point harness might have one point attaching to the upper face 10C of the base compartment, with the other two points attaching to the front face 20A of the upper compartment.

In the compact position with the handle 52 retracted, the wheeled suitcase 2 is preferably small enough to fit under an airplane seat. Airlines typically allow a maximum size of 22×8×14 inches for carry-on luggage. Dimensions of 22×8×14 inches for the wheeled suitcase 2 are therefore preferred, but somewhat smaller dimensions are acceptable. A width of 14 inches or less allows the wheeled suitcase to fit easily down an airplane aisle.

The sliding upper compartment 20 lets the child sit 8 or more inches below where he would be if he simply perched on top of a wheeled suitcase. The center of gravity is significantly lowered and better balanced over the wheels. This reduces the strain on the arm of an adult pulling the suitcase. The wheeled suitcase is comfortable to pull. The lower center of gravity also makes the wheeled suitcase more stable.

If the upper compartment 20 is detachable, the size of the upper compartment 20, the lower compartment 10, or both may be increased if desired. The upper compartment 20 and the remainder of the unit would then fit as two separate pieces of carry-on luggage under a seat or into an overhead storage bin.

A third embodiment of the multipurpose wheeled suitcase is shown in FIGS. 5–7. The third embodiment of the wheeled suitcase 2 includes a base compartment 10 and an upper compartment 20, similar to those of the first embodiment. Instead of the upper compartment 20 sliding backward to expose the seat, the upper compartment moves horizontally and vertically between the compact position and the seat position. The upper compartment 20 moves forward and down from the compact position to form a footrest.

In the third and fourth embodiments in the seat position the upper compartment 20 is substantially adjacent to the front face of the base compartment. Depending on the exact configuration of the wheeled suitcase, various faces of the upper compartment 20 may be adjacent to the base compartment 10 in the seat position.

The upper face 10C of the base compartment forms a seat in the seat position. The seat may or may not be covered by a fabric sheet 66 attaching the compartments together. The wheeled suitcase 2 may or may not include a backrest 60. The third and fourth embodiments may include a wheel assembly, side compartments, and the like, just as for the first two embodiments.

The wheeled suitcase 2 of the third embodiment includes a fabric sheet 66, diagrammatically shown in FIGS. 5–7. The fabric sheet 66 attaches the upper compartment 20 to the rest of the wheeled suitcase 2. Preferably the fabric sheet 66 attaches the upper compartment 20 to the base compartment 10.

The fabric sheet 66 is long enough for the upper compartment 20 to hang in an appropriate position in front of the base compartment 10 to serve as a footrest. The fabric sheet 66 has two ends, which extend generally perpendicular to the planes of the side faces 20E. One end is attached to the upper compartment 20.

The other end may be attached to the handle 52, to the backrest 60, or to the front, upper, or rear faces of the base compartment 10.

Using the upper compartment 20 to form a footrest, instead of a back support, has several advantages. The center of gravity is even lower than in the first two embodiments. The weight of the compartments and the child is evenly distributed over the wheels, so that the wheeled suitcase is stable and easy to pull.

As shown in FIG. 5, in the compact position the lower face 20D of the upper compartment 20 rests substantially on the upper face 10C of the base compartment 10. The fabric sheet 66 is sandwiched in-between. The fabric sheet 66 may wrap around the upper compartment 20 in the compact position, as shown in FIG. 5, or may be rolled or folded in a variety of ways. The fabric sheet 66 may wrap around two or more faces of the upper compartment 20 in the compact position. In FIG. 5 the fabric sheet 66 is shown wrapping three faces of the upper compartment.

In FIGS. 6 and 7, the upper compartment 20 is rolled down along the front face 10A of the base compartment 10, partially unwrapping the fabric sheet 66. The upper compartment 20 in the seat position rests against the front face 10A of the base compartment 10, substantially near the rest pad 12. The upper compartment 20 is at least partially suspended from the fabric sheet 66. The upper compartment 20 may be secured to the base compartment 10, after the fabric sheet 66 has been unfolded, by various structures, such as adhesive strips, hook and loop (e.g., VELCRO) fasteners, snaps, clips, etc.

As shown in FIGS. 6 and 7, in the seat position a seat is formed by the upper face 10C of the base compartment 10. A portion of the fabric sheet 66 covers the seat and acts as a seat cover. In the seat position the upper face 20C of the upper compartment 20 is substantially adjacent to the front face 10A of the base compartment 10. The front face 20A of the upper compartment 20 forms the footrest.

Since in the third embodiment the upper compartment 20 acts as a footrest instead of supporting the child's back, some sort of back support is desirable. Back support adds both to the comfort of the child in the seat and to his safety, since he is less likely to slide out backwards through the handle.

Back support may be provided by the backrest 60. The backrest 60 is adapted to support the child's back when the upper compartment 20 is in the seat position. The backrest 60 may also serve to stabilize the upper compartment 20 in the compact position and prevent it from moving backward. The backrest 60 may be of rigid plastic or other rigid material. The backrest may also be composed of canvas or other flexible material. If the backrest 60 extends beyond the upper face of the upper compartment in the compact position, it is preferably foldable or rollable when not in use, as shown in FIGS. 5–7. The backrest 60 in the seat position preferably is sufficiently long to reach the level of the child's shoulders. The backrest 60 may be as simple as one or two straps extending between the slide tubes 54 of the handle. The backrest may be permanently or releasably attached to the handle 52.

Several different configurations are possible for a foldable backrest 60. In the compact position the backrest 60 may fold forward so that it lies between the upper and lower compartments. The backrest 60 may also slide up and down in a channel between the slide tubes of the handle 52.

In FIG. 5, a foldable backrest 60 is shown folded and stored between the retracted handle 52 and the upper compartment 20. FIG. 6 shows the backrest 60 almost unfolded. FIG. 7 shows the backrest 60 fully unfolded and touching the fully extended telescoping handle 52. The backrest 60 may be releasably attached to the handle 52 by a securing mechanism 53. The securing mechanism 53 may be a clip, as shown in FIG. 7. Other possible securing mechanisms include adhesive strips, hook and loop fasteners, ties, snaps, etc.

The upper compartment 20 of the third embodiment may be detachable, as in the first embodiment. This allows the upper compartment to be used separately and/or allows the size of the compartments to increase, while still meeting the size limits for carry-on luggage.

A harness 55, such as a seat belt, may be included in the wheeled suitcase 2 to secure the child 6 in the seat, as in the first embodiment. The harness 55 may attach to the upper face 10C of the base compartment, the side compartments 30 (if any), the handle 52, or the backrest 60. The fabric sheet 66 may have slots, if necessary, to allow the straps of the harness 55 to pass through FIG. 8 shows a fourth embodiment of the wheeled suitcase. The fourth embodiment includes a fabric sheet 66, as in the third embodiment. The fabric sheet 66 has a first end 71 and a second end 73. The first end 71 of the fabric sheet 66 is attached to the upper compartment 20 substantially near the upper face 20C and the rear face 20B of the upper compartment 20. The second end 73 is attached to the upper face 10C of the base compartment 10, approximately mid-way between the front and rear faces 10A and 10B of the base compartment. The first and second ends 71 and 73 of the fabric sheet 66 extend generally perpendicular to the planes of the side faces 10E and 20E of the compartments.

In the compact position the fabric sheet 66 is wrapped around the rear face 20B of the upper compartment. In the seat position the rear face 20B of the upper compartment is substantially adjacent to the front face 10A of the base compartment. The upper face 20C of the upper compartment forms the footrest. The upper compartment 20 in the seat position is at least partially suspended from the fabric sheet 66.

Moving the upper compartment 20 between the compact position and the seat position is very quick and simple. In the fourth embodiment the orientation of the upper compartment 20 does not change as it moves between the compact position and the seat position. This is advantageous because the contents of the upper compartment 20 are less likely to be damaged or disordered by being shaken and turned unnecessarily. In particular, if the upper compartment 20 is configured as a diaper bag, it is desirable to avoid turning bottles and the like upside down. This helps to prevent leaks.

A large difference in length between the compartments is not required for the footrest of the fourth embodiment. For example, typical lengths for the upper and base compartments would be 8 inches and 14 inches respectively (for a total of 22 inches). When the upper compartment 20 moves forward and down, the seat and footrest differ in height at most by about 6 inches. This is more than adequate for the purposes of the invention. While older toddlers may have longer legs than this, they generally do not object to having their knees raised for the time required to negotiate an airport. Some children enjoy this as a change of pace from the usual feet-swinging posture when a child sits on a seat sized for adults.

It is to be understood that the present invention is not limited to the embodiments described above, but encompasses any and all embodiments within the scope of the following claims.

I claim:

1. A multipurpose wheeled suitcase comprising:
   (a) a base compartment and an upper compartment, each of the compartments having a front face, a rear face, an upper face, a lower face, and two side faces, the upper compartment moving horizontally and vertically between a compact position and a seat position, the lower face of the upper compartment in the compact position being substantially adjacent to the upper face of the base compartment, the upper compartment being substantially adjacent to the front face of the base compartment in the seat position, the upper face of the base compartment forming a seat in the seat position, the seat being adapted to seating a child, the upper compartment forming a footrest in the seat position;
   (b) a handle, the handle being attached to the rear face of the base compartment, and having a telescoping tube and a slide tube so that the handle has a retracted position and an extended position, the handle being adapted to moving the wheeled suitcase; and
   (c) at least two base wheels, each base wheel being rotatably attached to the base compartment, substantially near the lower face, the rear face, and one of the side faces of the base compartment.

2. The wheeled suitcase according to claim 1, further comprising two rest pads, each rest pad being attached to the lower face of the base compartment, substantially near the front face and one of the side faces of the base compartment.

3. The wheeled suitcase according to claim 1, further comprising two side compartments, each of the side compartments being substantially adjacent to one of the side faces of the upper compartment in the compact position.

4. The wheeled suitcase according to claim 1, further comprising a retractable wheel assembly, the wheel assembly having two retractable wheels, an axle, and at least two wheel supports, each of the wheel supports being attached to one of the retractable wheels, each of the wheel supports being pivotally attached to the rear face of the base compartment, so that the wheel supports have a retracted position and an extended position.

5. The wheeled suitcase according to claim 1, further comprising a backrest, the backrest being adapted to support a back of the child when the upper compartment is in the seat position, the backrest being attached to the handle.

6. The wheeled suitcase according to claim 1, further comprising a harness, the harness being adapted to retain the child in the seat.

7. The wheeled suitcase according to claim 4, wherein the upper compartment is secured in the compact position by hook and loop fastener.

8. The wheeled suitcase according to claim 1, wherein the handle is generally U-shaped and has a cross bar.

9. The wheeled suitcase according to claim 1, wherein the upper compartment is attached to the base compartment by a fabric sheet.

10. The wheeled suitcase according to claim 9, wherein the upper face of the upper compartment in the seat position is substantially adjacent to the front face of the base compartment, the front face of the upper compartment forms the footrest, the fabric sheet is wrapped around at least one face of the upper compartment in the compact position, and the fabric sheet at least partially unwraps as the upper compartment moves to the seat position, so that the upper compartment in the seat position is at least partially suspended from the fabric sheet.

11. The wheeled suitcase according to claim 9, wherein the rear face of the upper compartment in the seat position is substantially adjacent to the front face of the base compartment and the upper face of the upper compartment forms the footrest, so that the upper compartment in the seat position is at least partially suspended from the fabric sheet.

12. The wheeled suitcase according to claim 9, wherein the fabric sheet has a first end and a second end, the first end of the fabric sheet being attached to the upper compartment substantially near the rear face and the upper face of the upper compartment, the second end being attached to the upper face of the base compartment.

13. The wheeled suitcase according to claim 9, wherein the fabric sheet is releasably attached to at least one of the upper and base compartments by a zipper.

14. A convertible wheeled suitcase comprising:
   a base compartment having an upper wall and a lower wall and at least one wheel for ground transport of said base component;
   a handle attached to the base compartment for wheeling said base compartment;
   an upper compartment having a lower wall, said upper compartment removably attached to said base compartment and said lower wall resting on said upper wall to define a first position;
   attachment means for selectively and convertibly securing said upper compartment to said base compartment in both said first position and a second position, wherein said upper compartment is offset from said base compartment by substantially the entire width of said upper compartment exposing said upper wall of said base compartment, and thereby forming a stepped second position.

* * * * *